United States Patent [19]

Takeoka et al.

[11] Patent Number: 4,647,947
[45] Date of Patent: Mar. 3, 1987

[54] OPTICAL PROTUBERANT BUBBLE RECORDING MEDIUM

[75] Inventors: Yoshikatsu Takeoka, Kawasaki; Nobuaki Yasuda, Zushi, both of Japan

[73] Assignee: Tokyo Shibaura Denki Kabushiki Kaisha, Kawasaki, Japan

[21] Appl. No.: 775,958

[22] Filed: Sep. 13, 1985

Related U.S. Application Data

[63] Continuation of Ser. No. 473,215, Mar. 8, 1983, abandoned.

[30] Foreign Application Priority Data

Mar. 15, 1982 [JP] Japan .................................. 57-39426
Mar. 15, 1982 [JP] Japan .................................. 57-39427

[51] Int. Cl.$^4$ ........................................... G01D 15/34
[52] U.S. Cl. ................................. 346/135.1; 346/76 L; 365/113; 365/126; 369/284; 430/945
[58] Field of Search ..................... 346/76 L, 135.1; 365/113, 126; 369/284; 430/945

[56] References Cited

U.S. PATENT DOCUMENTS

| | | | |
|---|---|---|---|
| 3,866,187 | 2/1975 | Dougherty et al. | 365/125 |
| 4,357,616 | 11/1982 | Terad et al. | 346/135.1 |
| 4,379,299 | 4/1983 | Fitzpatrick et al. | 346/1.1 X |
| 4,388,400 | 6/1983 | Tabei et al. | 430/346 X |
| 4,433,340 | 2/1984 | Mashita et al. | 346/135.1 |

FOREIGN PATENT DOCUMENTS

| | | |
|---|---|---|
| 0022313 | 1/1981 | European Pat. Off. |
| 0046104 | 4/1981 | European Pat. Off. |
| 0058496 | 6/1981 | European Pat. Off. |
| 2441263 | 6/1975 | Fed. Rep. of Germany |
| 2744533 | 5/1979 | Fed. Rep. of Germany |
| 56-65340 | 3/1981 | Japan |
| 56-65341 | 3/1981 | Japan |
| 56-127937 | 7/1981 | Japan |
| 56-156942 | 9/1981 | Japan |

OTHER PUBLICATIONS

Patent Abstracts of Japan vol. 6, No. 38, 9 Mar. 1982.

*Primary Examiner*—E. A. Goldberg
*Assistant Examiner*—Gerald E. Preston
*Attorney, Agent, or Firm*—Oblon, Fisher, Spivak, McClelland & Maier

[57] ABSTRACT

A disk-shaped optical type recording medium is disclosed which includes a transparent substrate and recording layer formed on the substrate. The recording layer in a single layer, which is made of a material capable of absorbing energy reaching it through the substrate and being locally raised on one surface according to the absorbed heat energy of the laser beam.

17 Claims, 10 Drawing Figures

OPTICAL PROTUBERANT BUBBLE RECORDING MEDIUM

This application is a continuation of application Ser. No. 473,215, filed Mar. 8, 1983, now abandoned.

BACKGROUND OF THE INVENTION

This invention relates to a record carrier body serving as an optical type information recording medium and, more particularly, to a record carrier body for storing information therein by forming its recording layer with protuberances instead of holes or pits.

It is well known in the art to project a laser beam (which has been pulse-modulated according to write information) onto a recording layer of an optical type record carrier body such as an optical disk to thereby form an arrangement of pits corresponding to the write information in the recording layer. In this type of data recording technique, however, it is inevitable that a so-called "rim" of the material of the recording layer will be undesirably formed surrounding each pit in the area in which the laser beam is incident and/or that the recording layer material will be thermally fused and sputtered. Such rims of sputtering of the recording layer material will cause noise, when the information stored in the optical disk, in the above manner, is read out in playback. The signal-to-noise ratio of the reproduced data is thereby reduced. Moreover, the formation of pits in the recording layer of the optical disk requires heating the recording layer to a temperature above the melting or boiling point of the layer with the laser beam. This heating deteriorates the quality of the recording layer itself and reduces the life of the optical disk.

Optical disks, in which the recording layer is adapted to be formed with protuberances or plastically raised portions, rather than pits, when writing information, have been developed. Japanese Patent Disclosures (KOKAI) Nos. 56-65341 and 56-127937 show optical disks of this type.

In the data recording media disclosed in Japanese Patent Disclosure (KOKAI) No. 56-127937, no pits are formed in the recording layer when recording information, so that the drawbacks mentioned above can be overcome. However, the recording sensitivity is inferior. To be more specific, the data recording medium disclosed includes an organic intermediate layer, which is formed on a substrate and does not absorb energy, and an energy-absorbing layer consisting of a metallic material formed on the intermediate layer. In an information write mode, the energy-absorbing layer is locally heated in areas struck by a laser beam. The locally heated portions of the energy-absorbing layer heat the organic intermediate layer. That is, the organic intermediate layer is heated indirectly by the laser beam striking the energy-absorbing layer. When the organic intermediate layer is heated, it generates gases to push out and plastically deform the upper energy-absorbing layer. The energy-absorbing layer is thus formed with protuberances corresponding to the recording information. The efficiency of information writing, therefore, is extremely poor, and a high energy laser beam is undesirably necessary for writing data.

The optical type information recording medium disclosed in Japanese Patent Disclosure (KOKAI) No. 56-65341, involves difficulties in manufacture. More specifically, the recording medium includes a metallic light-reflecting layer, a gas-liberating layer that does not absorb energy, and a metallic energy-absorbing layer, which are laminated in the mentioned order on a substrate. The recording of information is performed again by locally heating the uppermost energy-absorbing layer with a laser beam, whereby the intermediate layer is indirectly heated to generate gases to form protuberances of the uppermost layer in the manner as described above. The basic difference of this recording medium from that disclosed in the previously mentioned Japanese Patent Disclosure (KOKAI) No. 56-127937 is that the light-reflecting layer is sandwiched between the substrate and energy-absorbing layer to increase the efficiency of laser energy utilization. However, in order to improve the recording sensitivity of the recording medium of this type, it is necessary to accurately control the thickness of the light transmitting layers (i.e., the intermediate gas-liberating layer and energy-absorbing layer) according to the wavelength of the writing laser. This means that difficulties occur in the layer thickness control, in the manufacture of the recording medium. Moreover, because the recording medium has a three-layer structure, its manufacturing process becomes complicated, which also reduces the yield.

SUMMARY OF THE INVENTION

An object of the invention is to provide a new and improved record carrier body, which can store high quality information and which has excellent recording sensitivity.

Another object of the invention is to provide a new and improved record carrier body, which has a simple construction but which can store information such that the stored information can be reproduced with a high signal-to-noise ratio and high quality, and also with which recording layer protuberances or a protuberant pattern having satisfactory shapes can be formed using even a low energy laser beam.

The record carrier body according to the invention comprises a substrate and a layer formed on the substrate which absorbs energy of radiation projected thereon, and locally and superficially undergoes deformation so as to form raised portions where the energy of radiation is received. The layer noted above is single layer made of a material, which absorbs radiation energy and forms raised portions with the liberation of its gas components according to the absorbed energy.

BRIEF DESCRIPTION OF THE DRAWINGS

The present invention will be best understood by reference to the accompanying drawings, in which.

DETAILED DESCRIPTION OF THE PREFERRED EMBODIMENTS

Figure 1:
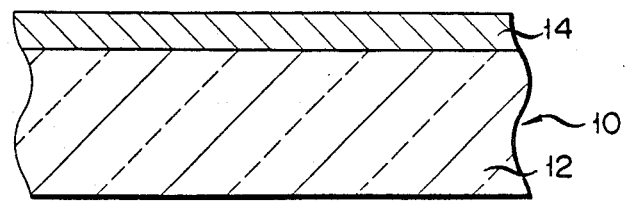
FIG. 1 is a sectional view partially showing an optical disk as one embodiment of the record carrier body according to the invention.

In FIG. 1, a portion of an optical disk 10 as in one embodiment of the record carrier body according to the invention is shown. The optical disk 10 comprises a round disk-like substrate 12 made of a transparent material and having a uniform thickness. A recording layer 14 is formed atop the substrate 12 such that it has a substantially uniform thickness. The recording layer 14, which has a single-layer structure, is made of a material capable of absorbing energy and of being raised by liberating its own gas components according to the absorbed energy. To be more specific, when the recording layer 14 is struck by a laser beam, it absorbs laser energy and is raised by its own emitted gas components according to the energy level of the incident laser beam. In this embodiment the laser 14 is made of a material which liberates gas components when heated and comprises a metal component. A suitable example of the material of the recording layer 14 is composed of one or more comparatively low-melting metals, e.g., tellurium (Te), antimony (Sb), tin (Sn), bismuth (Bi), idium (In), cadmium (Cd), zinc (Zn), lead (Pb), etc., and a gas component consisting of one or more elements which can be in a gaseous state at normal (room) temperature or exist be readily rendered gaseous in an atmosphere below a predetermined temperature (i.e., 400° C.), e.g., nitrogen (N), carbon (C), hydrogen (H), oxygen (O), phosphorus (P), iodine (I), bromine (Br), sulfur (S), etc. Patricularly, hydrogen, or a mixture of hydrogen and an element selected from a group consisting of nitrogen, carbon, oxygen, phosphours, iodine, boromine and sulfur, is preferably used as the gas component for the recording layer 14.

Figure 2:
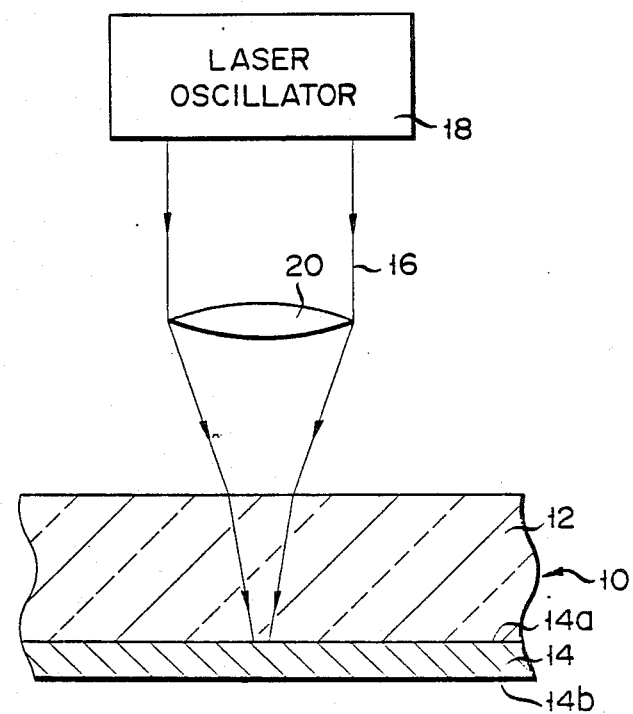
FIG. 2 is a view showing a set-up, in which a write laser beam is projected onto the optical disk of FIG. 1 on the substrate side thereof.
Figure 3:
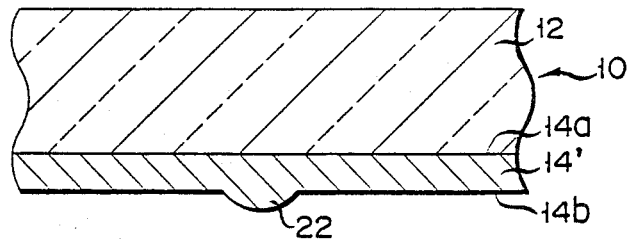
FIG. 3 is a sectional view partially showing the optical disk of FIG. 1 with a recording layer thereof raised to form a protuberance according to write information contained in a laser beam in the set-up of FIG. 2.

The method of writing information or data into the optical disk 10 shown in FIG. 1 will now be described with reference to FIGS. 2 and 3. A write laser beam 16 projected from a laser oscillator 18 is focused by a focusing lens 20 to be incident on the optical disk 10 on the side of the transparent substrate 12 thereof, as shown in FIG. 2. The laser beam 16 incident on the substrate 12 proceeds through the substrate 12 and reaches the recording layer 14, i.e., the interface 14a between the substrate 12 and recording layer 14. The laser beam 16 is refracted as it proceeds through the transparent substrate 12. It is controlled by the lens 20 such that a beam spot having a predetermined diameter is formed on the interface 14a between the substrate 12 and recording layer 14. The portion of the recording layer 14 that is struck by the laser beam 16 is heated to absorb heat energy and liberate the gas component. As a result, this portion of the recording layer 14 is raised to form a superficial protuberance 22 on the side opposite to the side of the laser beam incidence. If the laser beam 16 is caused to strike the substrate 12 of the optical disk 10 continuously and with a constant intensity (which will be described later in detail) such as to draw a predetermined track, e.g., a spiral track, a continuous and essentially spiral protuberance 22 having a constant height is thus formed on the surface 14b of the recording layer 14. When the laser beam 16 striking the optical disk 10 has been pulse-modulated according to write information, a group of protuberances, that is to say, a protuberant pattern 22 representing the write information is formed on the surface 14b of the recording layer 14.

As mentioned earlier, the recording layer 14 which receives the laser beam 16 through the substrate 12, absorbs laser energy; it is thus directly and locally heated by the laser beam 16. By this local heating, gases are generated in the recording layer 14. The protuberance 22 is formed on the side of the surface 14b of the recording layer 14 by the pressure of the generated gases. The shape of the protuberance 22 is determined by the energy level of the incident laser beam 16, the rotation speed of the optical disk 10, the contents of the metal and gas components contained in the recording layer 14 and the mechanical (or physical) characteristics thereof.

According to the invention, the recording layer 14 is comprised of a specific material as noted above, which is capable of absorbing energy and releasing gas components according to the absorbed energy. Thus, it can be manufactured as a single-layer structure and thus can be simply produced. That is, there is no need to laminate a plurality of layers or films, for instance two layers consisting of an energy-absorbing layer and a gas-emitting layer, in order to form the recording layer. Another important advantage is that the efficiency of utilization of the incident laser beam energy can be increased to improve the sensitivity of data writing. This is so because the layer of film that emits gases it heated not indirectly through a separate layer or film (as in the prior art), but directly by the laser beam. In other words, the increase in recording sensitivity is obtainable because a single layer structure can be utilized, as the recording layer 14 comprises a material capable of energy absorption and gas emission.

It should be noted that, in order to cause the recording layer 14 of the optical disk 10 to be raised to form the protuberance 22 as noted above, the write energy level of the laser beam 16 must be set to a predetermined level. This is so because if the write energy level of the laser beam 16 is below the predetermined level, the recording layer 14 will not be heated to a temperature sufficient to obtain a gas pressure necessary for the formation of the protuberance 22 on the recording layer 14. On the other hand, if the write energy level of the laser beam 16 exceeds the predetermined level, an excessive pressure will be generated by gases released in the recording layer 14 which receives the laser beam 16. In this case, the heated portion of the recording layer 14, i.e., the portion on which the laser beam 16 is incident, is liable to be ruptured thereby forming a pit. (This effect is the same as is obtainable with the prior art data recording technique based on the pit formation as mentioned earlier.) In order to obtain the aforementioned effect of the invention, therefore, it is very important to obtain the minimum energy level (J/cm$^2$), i.e., the threshold energy level $I_{th}$, of the laser beam 16 with which pits can be formed in the recording layer 14 and accurately set the actual energy level with which the laser beam 16 strikes the optical disk 10 on the basis of the threshold energy level $I_{th}$.

Figure 4:
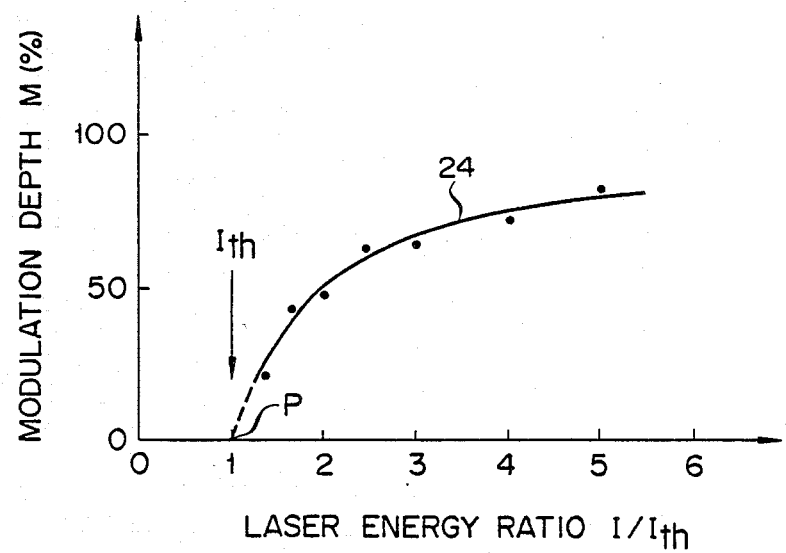
FIG. 4 is a graph showing the relation between the modulation depth of a hole formed in the recording layer and the ratio $I/I_{th}$ of the oscillated laser energy level I to a threshold laser level $I_{th}$ with respect to the recording layer.

FIG. 4 is a graph which is used to obtain the threshold energy level $I_{th}$ of the laser beam 16 incident on the recording layer 14. More particularly, the curve of FIG. 4 represents the modulation depth M (%) of the recording layer plotted against the ratio $I/I_{th}$ of the write energy level of the laser beam 16, which is caused to strike the optical disk 10 in the manner as described before in connection with FIG. 2, to a threshold laser level $I_{th}$ with respect to the recording layer 14. The modulation depth M of the holes is given as $$M = \frac{R_{max} - R_{min}}{R_{max} + R_{min}}$$

In this equation, $R_{min}$ represents the energy level of a laser beam reflected from the optical disk, in which pits are already formed in the recording layer, at a position of the disk corresponding to a pit or hole when a laser beam having an energy level too low to change the recording layer is caused to be incident on the disk on the recording layer side. $R_{max}$ represents the energy level of laser beam reflected from the surface of the recording layer in the neighborhood of the pit obtained with the same incident laser beam. When the laser energy level is reduced, the diameter of a pit formed in the recording layer by the laser beam is reduced to reduce the modulation depth M as shown in the graph of FIG. 4. The threshold energy level $I_{th}$ of the recording layer 14 can be determined on the basis of the value of the write energy I (J/cm$^2$) corresponding to the intersection P of the curve 24, i.e., the modulation depth M versus the write energy I curve, with the abscissa, that is, when the modulation depth M is zero.

Figure 5:
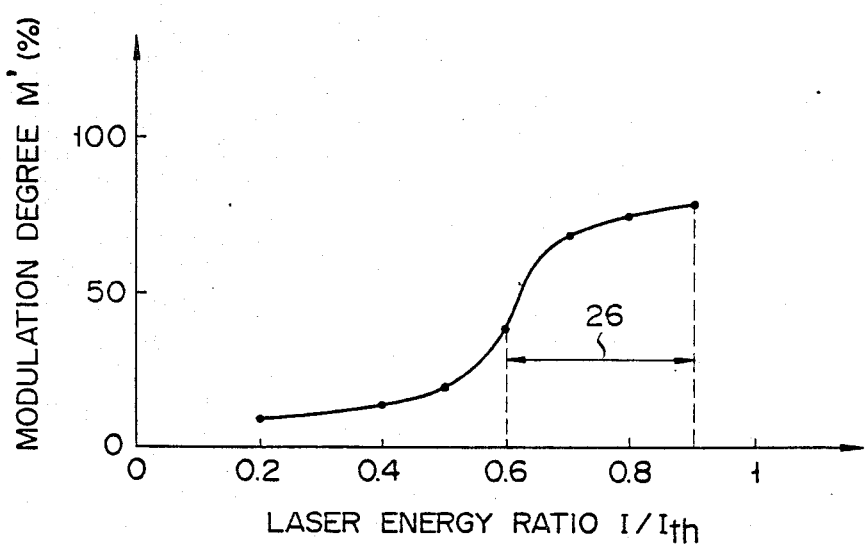
FIG. 5 is a graph showing the relation between the modulation degree and the ration $I/I_{th}$ of the oscillated laser energy level I to a threshold laser energy level $I_{th}$ determined on the basis of the graph of FIG. 4 with respect to the recording layer.

FIG. 5 shows the modulation degree M' of protuberance 22 formed on the recording layer 14 plotted against the laser energy ratio $I/I_{th}$ when the energy level of the write laser beam 16 caused to the incident on the recording layer 14 of the optical disk 10 is varied within the threshold energy level $I_{th}$. The modulation degree M' of protuberance 22 formed on the recording layer 14 substantially corresponds to the modulation depth M of a hole formed in the recording layer 14. The laser energy ratio $I/I_{th}$, for which the abscissa of the graph of FIG. 5 is taken, is the ratio of the actual energy level I of the laser beam 16 to the threshold energy level $I_{th}$. As is apparent from the graph of FIG. 5, if the actual energy level I of the laser beam 16 is somewhere between $0.2I_{th}$ and $0.9I_{th}$, protuberances 22 can be formed on the recording layer 14 without the possibility of forming pits. In order to further increase the modulation degree M' (%) and reliably prevent undesired formation of pits in the recording layer 14, it is preferably to control the laser beam 16 such that the actual energy level I of the write laser beam 16 falls within a range 26 from $0.6I_{th}$ to $0.9I_{th}$.

The optical disk 10 having the structure as shown in FIG. 1 can be obtained by using at least one low-melting metal such as tellurium (Te), antimony (Sb), tin (Sn), bismuth (Bi), indium (In), cadmium (Cd), zinc (Zn) and lead (Pb) as a target and sputtering the target metal with the plasma of a gas such as $N_2$, $NH_3$, $N_2H_2$, $CH_4$, $C_2H_4$, $C_2H_2$, $C_2H_6$, $H_2$, $O_2$, NO, $NO_2$, CO, $CO_2$, P, $PH_3$, $I_2$, $Br_2$ or $S_2$. As the gas for the plasma, any one of these components may be used, or two or more components may be used in combination. Further, rare-gas elements such as Ar, Kr, Xe and the like may be included in the gas in order to control the process of sputtering. 100% $N_2$ for the plasma and applying a ratio frequency (13.56 MHz) power of approximately 0.3 W/cm$^2$ between the target and substrate, a film containing approximately 10 atomic % of nitrogen could be formed. This record carrier body was used for information written in the form of protuberance by the method previously described, and the stored information was read out to obtain a modulation degree of 0.8 with a write laser beam energy level of $0.9I_{th}$. As another example, a film, which was obtained by using tellurium as the target and applying radio frequency power of approximately 0.4 W/cm$^2$ between the target and substrate, contained approximately 8 atomic % of nitrogen, approximately 10 atomic % of hydrogen, and approximately 20 atomic % of carbon. The modulation degree obtained in writing information or data as protuberances using this record carrier body was 0.8 with a write laser energy level of $0.8I_{th}$ and 0.7 with an energy level of $0.6I_{th}$.

Further, recording layers having respective compositions of $Bi_{90}N_{10}$, $Bi_{80}C_5N_{10}H_5$, $In_{80}I_{10}H_{10}$, $Cd_{90}N_5H_5$, $Zn_{90}N_{10}$, $Pb_{90}N_5H_5$, $Te_{80}N_{10}O_{10}$, $T_{80}S_{10}H_{10}$, $Te_{80}I_{20}$ and $Te_{80}Br_{20}$ were formed by the method as described before using various combinations of metal targets and plasma gases. The modulation degrees obtained with these recording layers used to form protuberances with a write laser energy level of $0.8I_{th}$, were respectively 0.8, 0.8, 0.8, 0.7, 0.7, 0.7, 0.7, 0.6, 0.6 and 0.6. With a write laser energy level of $0.6I_{th}$, the modulations obtained were respectively 0.7, 0.7, 0.6, 0.6, 0.6, 0.6, 0.6, 0.5, 0.5 and 0.5.

It will be seen from the above that a sufficient modulation degree M' can be obtained in the formation of protuberances when the write laser beam energy level is $0.6I_{th}$ to $0.9I_{th}$. In the recording system based on the formation of pits, the energy level of the write laser beam necessary for forming pits with a modulation degree of 0.5 or above ranges from $2I_{th}$ to $3I_{th}$. Thus, in the recording system based on the formation of protuberances, the necessary energy level of a write laser beam is only one-half to one-fifth the level of the recording system based on the formation of pits. According to the present invention, in contrast to the prior information recording medium having a complicated construction (such as one comprising a lamination of an energy-absorbing layer, a gas-emitting layer and a light-reflecting layer), it is possible to obtain high-sensitivity information recording with a simple record carrier body. Further, the fact that the recording layer has a single-layer structure is desirable from the standpoint of reducing the cost of manufacture and improving the manufacturing yield.

Figure 6:
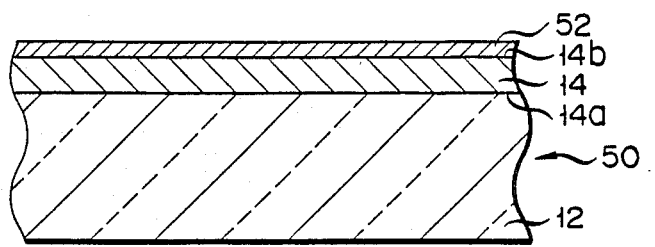
FIG. 6 is a sectional view partially showing an optical disk as a different embodiment of the invention.

Referring now to FIG. 6, an optical disk 50 is shown as a different embodiment of the record carrier body according to this invention. Parts in the Figure that correspond to those in FIG. 1 are designated by like reference numerals and are not described.

Figure 7:
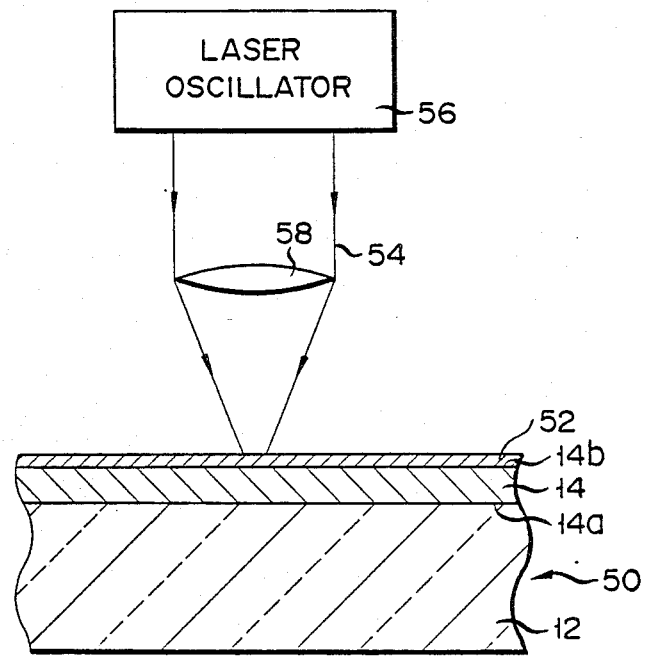
FIG. 7 is a view showing a set-up, in which a write laser beam is projected onto the optical disk of FIG. 6 on the side of the cover film.

In this embodiment, a cover layer or film 52 is formed on the surface 14b of recording layer 14 formed on the transparent substrate 12. The cover layer 52 comprises a material which does not substantially absorb energy, such as a thin metallic material. The cover layer 52 is provided in order that a write laser beam 54 from a laser oscillator 56 may reach the recording layer 14, as shown in FIG. 7, so as to form a protuberance more efficiently. To be more specific, the cover layer 52 is provided for improving the shape of the protuberance that is formed by the laser beam on the surface 14b of the recording layer 14 in the manner as described above, thereby further increasing the modulation degree of the reproduced information signal.

As shown in FIG. 7, the writing of information into the optical disk 50 is done by projecting the laser beam 54 generated from the laser oscillator 56 through a focusing lens 58 onto the optical disk 50 on the side of the cover film 52. The laser beam 54 is focused by the lens 58 to form a spot having a predetermined diameter on the film 52. As mentioned earlier, the film 52 does not substantially absorb the energy of the laser beam. Thus, most of the energy of the laser beam 54 which is incident on the film 52 and which excludes the energy of reflected laser beam at the film 52 is transmitted to the underlying recording layer 14. The recording layer 14 absorbs the energy of the laser beam 54 to liberate the gas component and thus form a protuberance 60. It should be noted that the laser beam energy is received on the surface 14b of the recording layer 14 opposite the interface 14a with the substrate 12, and the protuberance 60 is formed on the side of this surface 14b. When the protuberance 60 is formed, the corresponding portion of the cover film 52 formed on the recording layer surface 14b is also raised. That is, a protuberance 62 corresponding to the protuberance 60 of the recording layer 14 is formed on the film 52.

Figure 8:
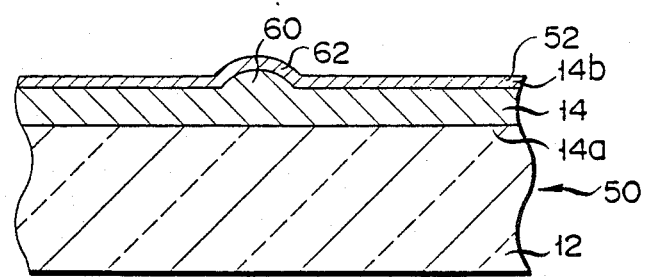
FIG. 8 is sectional view partially showing the optical disk of FIG. 1 with the recording layer thereof raised to form a protuberance on the side of the cover film according to write data contained in the laser beam in the set-up of FIG. 7.
Figure 9:
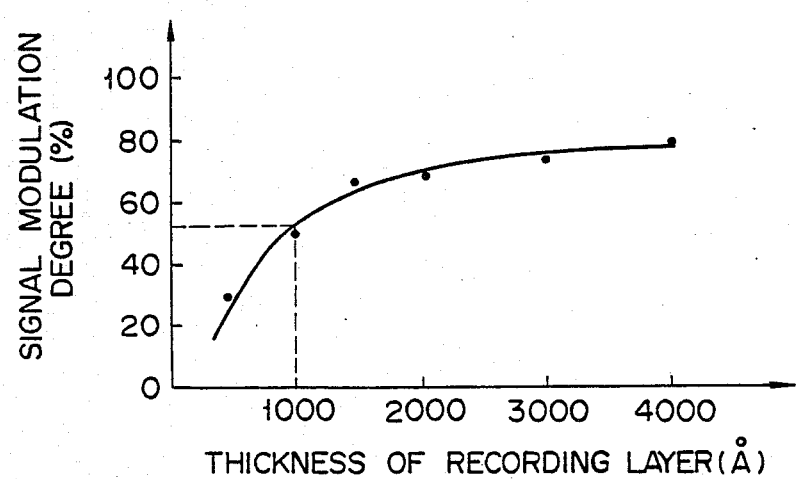
FIG. 9 is a graph showing the relation between the modulation degree of a signal and the thickness of the recording layer of the optical disk of FIG. 1.

In the embodiment of FIGS. 6 to 8, the thickness of the recording film 14 requires a certain restriction, though not so strict as in the aforementioned prior art, such as Japanese Patent Disclosure (KOKAI) No. 56-127937. If it is too thin, it is difficult to obtain sufficient gas pressure to cause proper deformation of the film 52. FIG. 9 shows the relation between the modulation degree of the reproduced signal and the thickness of the recording layer 14 in a case where the cover film 52 was a silver (Ag) film having a thickness of 100 Å while the recording layer 14 as an intermediate layer had component proportions of $Te_{60}C_{25}N_{10}H_5$. As is shown, the signal modulation degree was more than 50% when the thickness of the recording layer 14 was above 1,000 Å.

The metal of the cover film 52 is ductile enough so that it will not be ruptured by a force beyond the limit of its own elasticity, and so can be raised to form a protuberance by the liberation of gas in the recording layer 14. According to the invention, the metal of the cover film 52 may be gold (Au), platinum (Pt), palladium (Pd), rhodium (Rh), indium (Ir), copper (Cu), nickel (Ni), cobalt (Co), iron (Fe), manganese (Mn), chromium (Cr), vanadium (V), titanium (Ti), zirconium (Zr), niobium (Nb) and aluminum (Al) as well as silver. These metals may be used singly or as alloys of two or more components. It is particularly desirable to use noble metals such as gold, silver, platinum, palladium, rhodium and iridium or alloys of these metals. These metals may be deposited by means of vacuum deposition, electron beam deposition or sputtering, using them as a target and argon gas for the plasma.

The thickness of the cover metal film requires a certain restriction, though not so strict as in the aforementioned prior art, in order to allow formation of protuberances having a shape with a high modulation degree of reproduced information and also to reduce the write energy level. If the cover metal film is excessively thick, it will absorb energy (which is, of course, undesirable). To improve the modulation degree, the energy absorbed by the intermediate layer, i.e., the recording layer, must be increased in order to increase the force acting on the cover layer.

Figure 10:
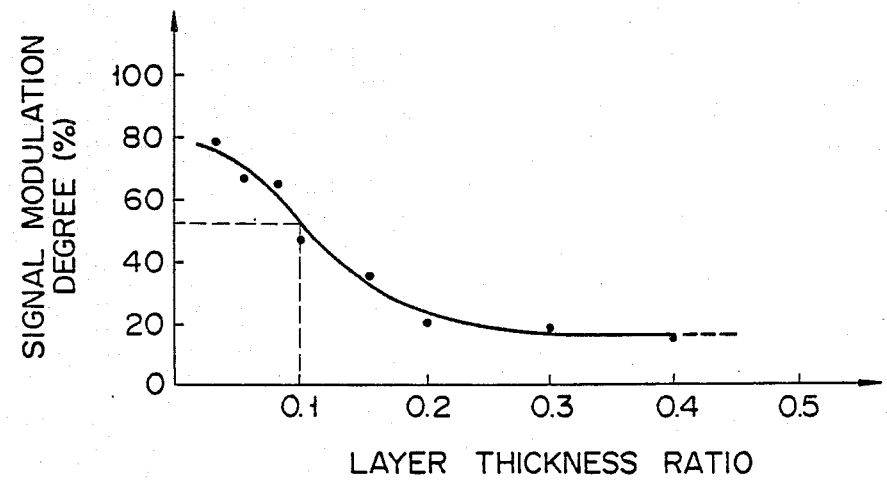
FIG. 10 is a graph showing the relation between the modulation degree of a reproduced signal and the thickness ratio between the cover layer and recording layer when writing data into the optical disk with a constant laser beam energy level.

FIG. 10 shows the relation between the modulation degree of the reproduced signal and the thickness ratio between the cover metal film and intermediate layer of a record carrier body in which the recording layer as the intermediate layer had a thickness of 3,000 Å and the cover metal film was a gold film, obtained by turning the record carrier body at a speed of 4 m/sec and using a laser beam having a fixed energy level. As shown, the modulation degree of the reproduced signal was more than 50% when the thickness of the cover metal film was less than one-tenth the thickness of the recording layer.

The reflectance and transmittance of a record carrier body, in which the cover metal film was a gold film with a thickness of 100 Å and the recording layer had thickness of 3,000 Å and component proportions of $Te_{60}C_{25}N_{10}H_5$, were measuring by projecting a low energy laser beam onto the record carrier body on the cover film side, and they were respectively, 64% and 1%. The effective absorption of this record carrier body is thus 35%. Similar measurements of the reflectance and transmittance, under the same conditions as above, were made with a record carrier body, which had no cover metal film and in which the recording layer had a thickness of 3,000 Å and component proportions of $Te_{60}C_{25}N_{10}H_5$, and they were, respectively, 30% and 36%. The effective absorption of this record carrier body is 34%. From the above results, the absorption of the cover metal film is estimated to be approximately 1%. In other words, it can be thought that the cover metal layer noted above is substantially incapable of absorbing energy. Recording and reproduction were performed using the record carrier body noted above, in which the cover film was the gold film and the recording layer as the intermediate layer had component proportions of $Te_{60}C_{25}N_{10}H_5$, and protuberances having satisfactory shapes could be formed. The modulation degree of the reproduced signal was 65%.

When obtaining a reproduced signal from the stored information by detecting the stored information as changes in the energy level of a read beam, the energy level of the read beam should be less than approximately one-tenth of the write beam energy level. This is so in order to prevent destruction of the stored information or additional writing by the read beam. Where the energy level of the read beam is low, the cover film must have a sufficient reflectance with respect to the read beam. If the reflectance is insufficient, noise generated from a reflected read beam detector will be increased to reduce the signal-to-noise ratio of the reproduced signal. When the reflectance from the cover film side was above 50%, the signal-to-noise ratio was above 30 dB.

A record carrier body, in which the intermediate layer or recording layer had a thickness of 3,000 Å and component proportions of $Te_{60}C_{25}N_{10}H_5$ and the cover film had a thickness of 150 Å and was made of gold, silver, platimum, palladium, rhodium and iridium was used to write information from the cover film side by using a semiconductor laser with an energy of 4 mW, for 400 nsec., and turning the record carrier body at a peripheral speed of 4 m/sec, and to read the stored data using a continuous read beam of 0.5 mW. The modulation degree of the reproduced signal was above 60 % and satisfactory. A record carrier body, in which the intermediate layer had a thickness of 4,000 Å and component proportions of $Te_{70}C_{20}N_5H_5$ and the cover film had a thickness of 130 Å and was made of copper, nickel, cobalt, iron, manganese, chromium, vanadium, tin, zirconium, niobium and aluminum was used to write information from the cover film side by using a semiconductor laser with an energy of 5 mW, 300 nsec. and turning the record carrier body at a peripheral speed of 3 m/sec., and to read the stored information using a continuous beam of 0.5 mW. The modulation degree of the reproduced signal in this case was above 50%.

Further, a record carrier body, in which the cover film was a gold film with a thickness of 150 Å and the intermediate layer had a thickness of 3,500 Å and component proportions of $Te_{80}N_{15}O_5$, $Te_{70}C_{20}P_5H_5$, $Te_{90}I_{10}$, $Te_{90}I_5Br_5$ and $Te_{90}S_5H_5$, was used to write information from the cover film side by using an argon laser with energy of 6 mW, 500 nsec. and by turning the record carrier bodies at a peripheral speed of 3 m/sec., and to read the stored information using a continuous beam of 1 mW. The modulation degree of the reproduced signal was above 35%.

Furthermore, a record carrier body, in which the recording layer had a thickness of 2,300 Å and component proportions of $Te_{60}C_{25}N_{10}H_5$ and the cover film was a gold film with a thickness of 200 Å, was used to write information from the cover film side using a semiconductor laser with an energy of 2 mW, 300 nsec., and to read the stored information with a continuous beam of 0.5 mW. The modulation degree of the reproduced signal in this case was 80% and satisfactory. The reason that sufficiently high modulation degree of the reproduced signal could be obtained even with such a low energy beam, is that most of the incident beam is transmitted through the substrate to be firstly absorbed in the recording layer, which is the energy-absorbing layer, while the rest of the incident laser beam is reflected by the cover metal film to be secondly absorbed by the energy-absorbing layer.

A record carrier body, which has been used for high modulation degree recording as in the above examples, may be utilized as a master disk for manufacturing optical type read-only record carrier bodies, with which a reproduced signal with a very high modulation degree can be obtained. More particularly, a nickel plate is formed through electroforming using the cover film as an electrode to obtain a stamper. The nickel plate, which is thus formed, and protuberances duplicating those of the stored information, is then separated from the record carrier body and is used to manufacture many organic resin disk by molding. A necessary reflecting film such as Al flim is then formed on the organic resin molding disk to obtain the read-only record carrier body.

Although the present invention has been shown and described with respect to particular embodiments, various changes and modifications which are obvious to a person skilled in the art to which the invention pertains are deemed to lie within the spirit of the invention. For example, while the above embodiments concern disk-shaped optical type recording media as the record carrier body, the invention is applicable to optical type recording media of any other shape as well. Further, the record carrier body according to the invention may be of a form other than a rotatable disk (e.g., a slidable card such as a slidable magnetic card or a rotatable drum). Further, it may be a flexible body such as a magnetic tape.

What we claim is:

1. A record carrier body comprising:
a substrate; and
an electromagnetic energy absorbing layer formed on the substrate and containing therein elements which are in a gaseous state at a temperature below a predetermined temperature, said layer being provided to store information according to incident electromagnetic radiation thereon, said layer being a single layer which, when a laser beam is exposed thereon, with an intensity of an energy level smaller than a predetermined minimum energy level necessary to form a hole or pit therein, absorbs the radiation energy therein, liberates said elements, and locally raises or bulges the laser beam-exposed area thereof according to the absorbed radiation energy, to store information with the raised area kept as it is, and
wherein said layer is made of a mixture of a low melting metal selected from the group consisting of tellurium, antimony, tin, bismuth, zinc and lead and said elements comprising ccarbon and hydrogen.

2. A record carrier body according to claim 1, wherein said low-melting metal is a compound made of a palurality of members selected from the group consisting of tellurium, antimony, tin, bismuth, indium, cadmium, zinc and lead.

3. A record carrier body according to claim 1, wherein said element is preferably a mixture of hydrogen and an element selected from a group consisting of nitrogen, carbon, oxygen, phosphorus, iodine, boromine and sulfur.

4. A record carrier body according to claim 1, wherein said layer is made of a mixture of a low-melting metal and an element which is in the gaseous state at room temperature.

5. A record carrier body according to claim 1, wherein said layer forms an interface with said substrate, said radiation incident on said layer being received at said interface through said substrate.

6. A record carrier body according to claim 1, which further comprises a film formed on said layer and made of a substantially energy-nonabsorbing material, such as a metal, to permit a thermal energy of said laser beam to be transmitted therethrough, said film being raised or bulged area of said layer by a force exceeding the limit of elasticity of said material.

7. A record carrier body according to claim 6, wherein when said laser beam is exposed on said film on the side of said film to form a light spot thereon said layer is deformed by said thermal energy of said laser beam such that the corresponding laser-exposped area thereof is locally raised or bulged from its junction with said film and thus the corresponding area of said film is locally raised or bulged whereby the configuration of the raised or bulged area is improved for information storage.

8. A record carrier body according to claim 6, wherein said film is a metallic film which is preferably made of a metallic material selected from a group consisting of silver, gold, platinum, palladium, rhodium, iridium, copper, nickel, cobalt, iron, manganese, chromium, vanadium, titnaium, zirconium, niobium and aluminum.

9. A record carrier body according to claim 8, wherein said metallic film is preferably made of a material selected from a group consisting of gold, silver, platinum, palladium, rhodium and iridium.

10. A record carrier body according to claim 8, wherein said metallic film is made of a material consisting of a plurality of members selected from the group consisting of silver, gold, platinum, palladium, rhodium, iridium, copper, nickel, cobalt, iron, manganese, chromium, vanadium, titanium, zirconium, niobium and aluminum.

11. A record carrier body according to claim 6, wherein said layer is locally raised on its side of the interface with said film according to the energy of said radiation received through said film, thereby causing corresponding raising of said film.

12. A record carrier body used as an optical disk, comprising:
a disk-shaped transparent substrate of a first thickness to permit a passage of an incident laser beam; and
a recording layer formed on said substrate and having a second thickness smaller than said first thickness of said substrate, said recording layer being made of a single electromagnetic energy absorbing layer containing therein elements which are in a gaseous state at a temperature below a predetermined temperature, said second thickness being selected such that, when the laser beam is exposed thereon with an intensity smaller than a threshold level, wherein said threshold level is a predetermined energy level necessary to form a hole or pit, said layer absorbs said radiation energy, liberates said elements, and locally raises or bulges the laser beam-exposed area thereof according to the absorbed radiation energy to store information with the raised or bulged area kept as it is,
said reocrding layer being made of a mixture of a low melting metal selected from a group consisting of tellurium, antimony, tin, bismuth, zinc and lead and said elements including carbon, hydrogen and at least one element selected from the group consisting of nitrogen, oxygen, phosphorus, iodine, bromine and sulfur.

13. A record carrier body according to claim 12, wherein said substrate has a first surface on which said laser beam is incident, said laser beam being focused to form a spot having a first diameter on said first surface, and a second surface forming an interface with said recording layer, which refracts said laser beam such that said laser beam forms a second spot having a diameter smaller than said first diameter on said second surface, said recording layer being headed in an area thereof corresponding to said second spot of said laser beam.

14. A record carrier body according to claim 13, wherein said recording layer has a third surface forming an interface with said second surface of said substrate and a fourth surface on the side opposite said third surface, the raising of said recording layer caused by said laser beam reaching said recording layer through said substrate taking place on said fourth surface.

15. A record carrier body according to claim 12, which further comprises:
a film provided on said recording layer and capable of efficiently transmitting said laser beam and being spread by a force in excess of the limit of elasticity of said film.

16. A record carrier body according to claim 15, wherein said film has a first surface on which said laser beam is incident, said laser beam being focused to form a spot having a predetermined diameter on said first surface, and a second surface forming an interface with said recording layer, which is raised together with said recording layer when said recording layer is locally raised by said laser beam, thereby forming protuberances corresponding to the protuberances of said recording layer on said first surface.

17. A record carrier body according to claim 12, wherein the second thickness of said recording layer is substantially equal to one-tenth of the first thickness.

* * * * *